Patented Apr. 17, 1923.

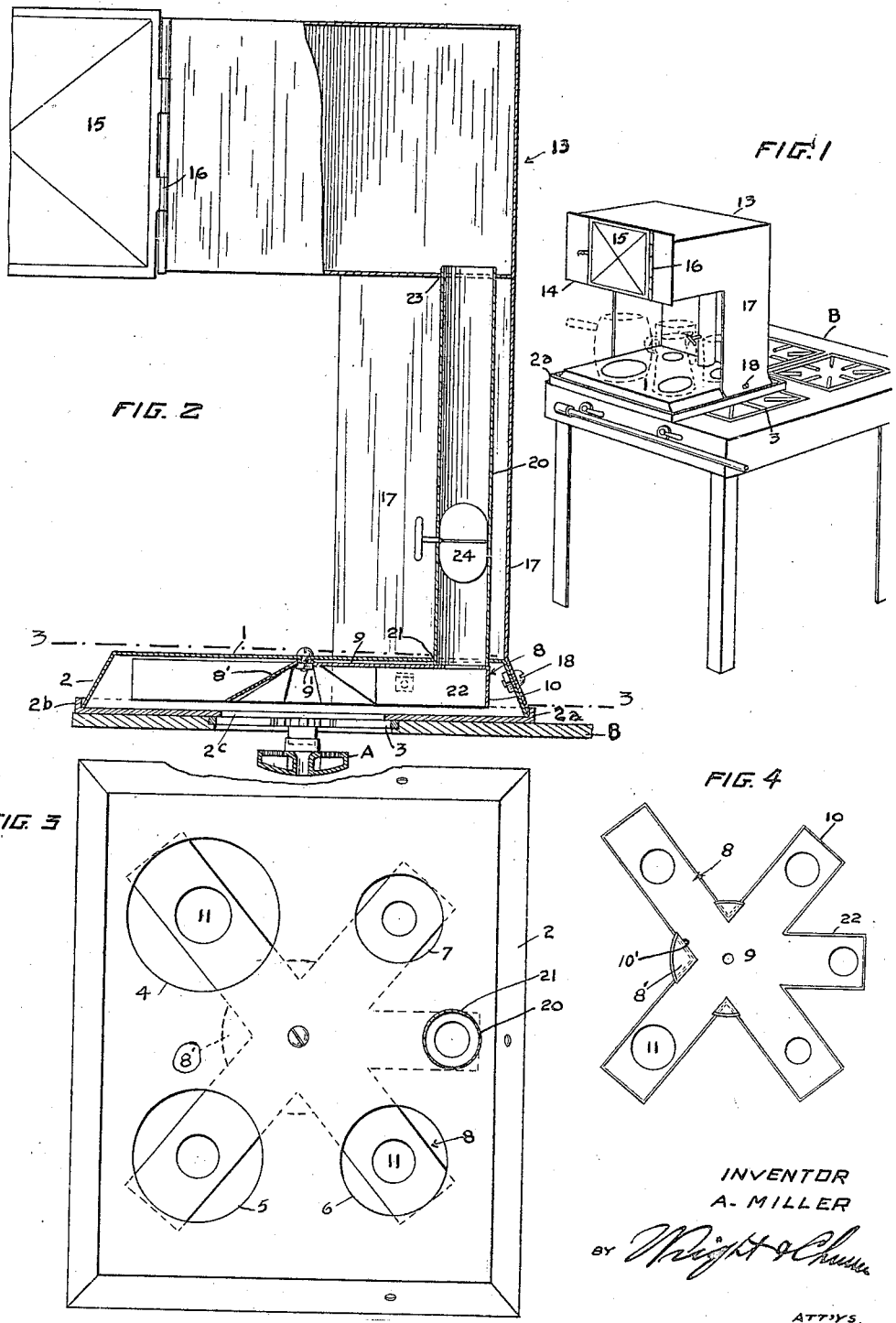

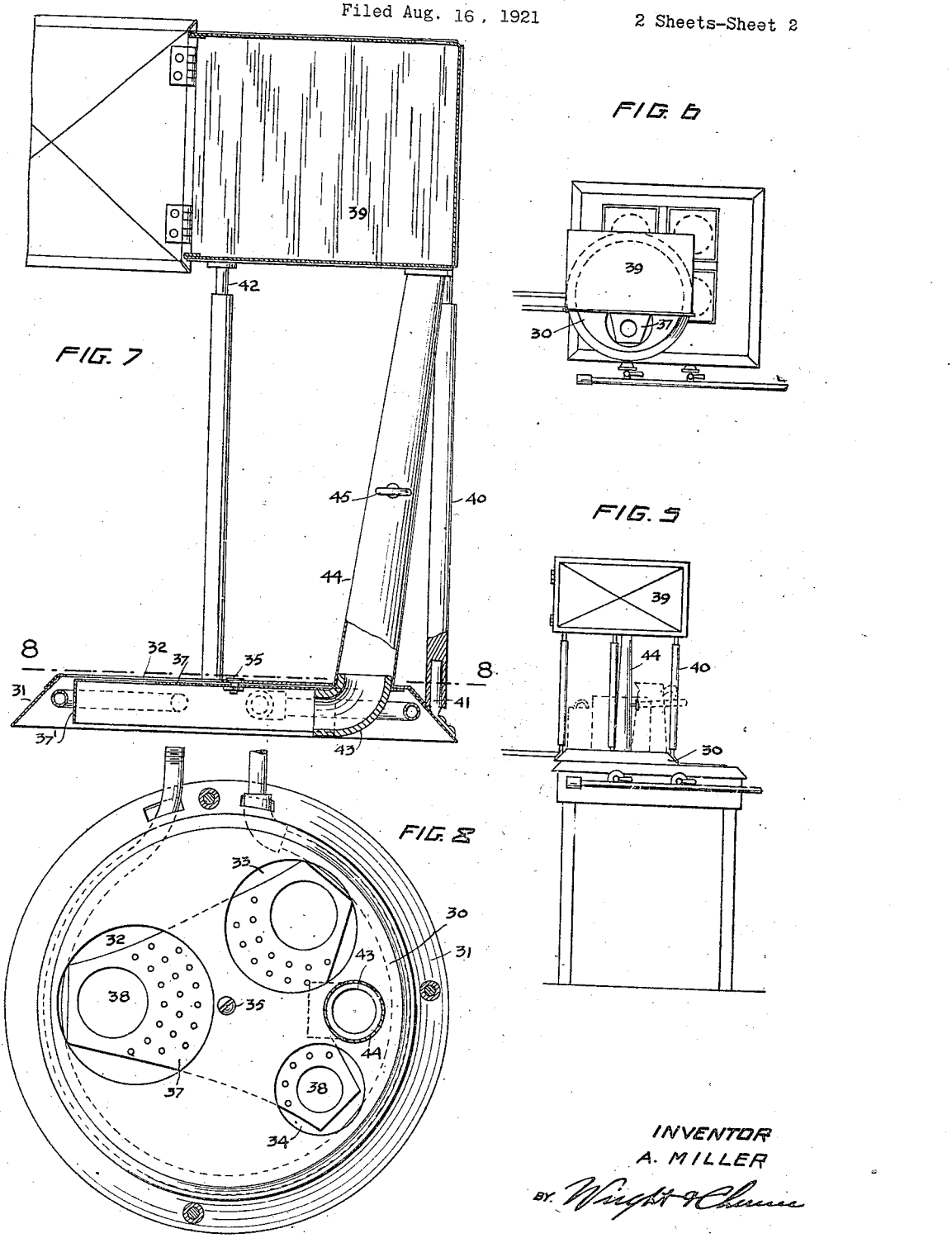

1,452,208

UNITED STATES PATENT OFFICE.

ANTHONY MILLER, OF BURLINGAME, CALIFORNIA.

COOKING DEVICE.

Application filed August 16, 1921. Serial No. 492,736.

*To all whom it may concern:*

Be it known that I, ANTHONY MILLER, a citizen of the United States, residing at Burlingame, in the county of San Mateo and State of California, have invented new and useful Improvements in Cooking Devices, of which the following is a specification.

The present invention relates to cooking devices for use in connection with cooking stoves, particularly gas ranges.

The primary object of the invention is to provide a simply constructed, compact and inexpensive cooking device by means of which a plurality of cooking vessels may be subjected to cooking heat from a single gas burner, whereupon a saving in gas is consummated and provision is made for carrying on a greater number of cooking operations than is possible with the ordinary gas range.

Another object of the invention is to provide a cooking device which comprises a hood like hot plate adapted to be placed upon the ordinary gas range hot plate over a single burner, the said device being so constructed that it will support a plurality of cooking vessels in such manner that cooking heat from said burner will be supplied to each of said vessels, there being also provided in conjunction with said device, a warming or oven chamber, the heat for which is obtained from the single burner thru a special construction forming a part of the present invention, the said cooking or oven chamber being removable or detachable so that the device may be used with or without said chamber as desired.

The invention possesses other advantages and features some of which, with the foregoing will be set forth at length in following description where I shall outline in full that form of the invention which I have selected for illustration in the drawings accompanying and forming a part of the present specification. In said drawings I have shown one form of the construction of my invention, but it is to be understood that I do not limit myself to such form since the invention as expressed in the claims may be embodied in a plurality of forms.

Referring to the drawings:

Fig. 1 is a perspective of a gas cook stove showing the cooking device of this invention as it would appear when in use.

Fig. 2 is an enlarged vertical sectional view of the device showing the oven partly in side elevation.

Fig. 3 is a cross sectional view taken on line 3—3 of Fig. 2.

Fig. 4 is a bottom plan view of the deflector.

Fig. 5 is a front elevation of the modified form of cooking device showing it in position on the stove.

Fig. 6 is a top plan view of the modified form as when mounted upon the stove.

Fig. 7 is an enlarged vertical sectional view of the modification device.

Fig. 8 is a cross sectional view taken on 8—8 of Fig. 7.

Referring to the embodiment of the invention as illustrated in the accompanying drawings, 1 designates a hood like hot plate, which as shown is of rectangular form, but which may be otherwise shaped. The plate is provided at its edges with downwardly and outwardly inclined walls or flanges 2. The lower edges of these walls are adapted to rest upon a plate $2^a$ which is placed upon the hot plate 3 of a gas range, as shown in Figs. 1 and 2, whereupon the hot plate 1 will be disposed in superposed parallel relation to the gas range hot plate 3, and the heat from the burner is confined beneath the plate by said walls. The plate $2^a$ is slightly larger than the plate 1 and has upturned edge flanges $2^b$ against which the walls 2 engage to hold the plate 1 in place. An opening $2^c$ slightly larger than the burner over which it is to be placed, is formed in the plate $2^a$ and permits heat from the burner to enter the space between the plates 1 and $2^a$. The plate $2^a$ prevents cold air from entering said space, whereby said space retains and concentrates the heat beneath the hot plate, eliminates waste of heat and provides for full application of the maximum heat produced. The hot plate 1 is of such size that it will accommodate or support a plurality of cooking vessels, say for example, four or more of such vessels, there being openings 4, 5, 6 and 7 in the hot plate 1, to permit of application of heat to vessels placed over said openings. Space between the vessels may be used for toasting bread and the like.

In using the device, the plate $2^a$ is placed over a single burner A of the gas range B with the burner substantially centrally located with relation to the opening $2^c$. The device is then mounted on the plate 2ª. The heat from the burner is distributed to the respective openings 4, 5, 6 and 7, over which openings cooking vessels are placed, by a heat distributing member 8, which is secured to the under side of the plate 1 within the confines of the walls 2 thereof. This distributor 8, in the form shown in the drawings, is substantially X shaped and the central portion thereof is placed immediately over the burner. The distributor comprises a flat top plate or wall 9, centrally bolted as at 9′ to the center of the hot plate and is provided with depending marginal flanges 10, which flanges serve to confine the heat beneath the wall or plate 9. A concavo-convex deflector plate 8′ is secured with its concave side lowermost to the central portion of the distributor so that heat from the burner flames will be deflected into the extensions or extremities of the distributor. The plate is cut away, as at 10′, to permit of the passage of heat into the said extensions or extremities. This plate will become red hot and serve as a means of radiation to increase the heat concentration within the distributor.

The extremities of the member 8 are located beneath the openings 4, 5, 6 and 7 and are provided with smaller openings 11 in the wall 9, which openings register with the openings 4, 5, 6 and 7. By reason of these extremities heat is conducted to the openings 4, 5, 6 and 7, without appreciable loss of heat and so that an even heat is provided at each opening.

By placing a hot plate device of the character described over a single burner and mounting a plurality of cooking vessels over the openings 4, 5, 6 and 7, heat from the single burner will be distributed so as to provide for simultaneously cooking within the several vessels. Thus, it is apparent that a decided saving in fuel may be effected and at the same time a greater number of cooking operations may be carried on simultaneously, than is the case when the cooking device is not employed.

The lower edges of the flanges 10 terminate slightly above the lower edges of the walls 2, to permit of free combustion of the burner. Thus, it will be seen, that the entire area confined by the plates 1 and 2ª and walls 2 serves as a heat collecting chamber and will cause the plate 1 to be effectively heated for cooking operations. The distributor 8 serves particularly as a means for concentrating and distributing the heat from a single burner to certain special points where it is desired to support cooking vessels so that the maximum heat will be evenly distributed to such points.

I may employ in connection with the hot plate, an oven or warming chamber 13, which will preferably be of rectilinear outline and closed except upon its front side 14. A door 15 is hinged as at 16 so as to provide for opening and closing the oven chamber. I preferably support this chamber above the hot plate device in such manner that the chamber or oven may be removed if desired. The oven 13 is supported by a wall 17, which is detachably secured by bolts 18 to the rear and end flanges or walls 2 of the hot plate 1. Thus the oven is disposed close to and directly over the hot plate. A tubular heat conduit 20 is extended thru an opening 21 in the hot plate 1 and communicates at its lower end with a distributor arm 22 extending downwardly from the mid portion of the distributor 8, said arm being of similar construction to the other extremities of the distributor. The tube 20 extends upwardly and close to the wall 17, into the oven thru an opening 23 formed in the lower side of said oven, whereby heat may be conducted from beneath the hot plate into the oven. As a means of regulating the heat passing thru the tube, a damper 24 is mounted in the tube and when this damper is closed, the oven may be used as a warming chamber. Due to the proximity of the oven to the hot plate, sufficient heat will be carried to the oven by radiation to permit of its use as a warming chamber.

Referring particularly to Figs. 5 and 8, inclusive, in which I have illustrated a modified form of the invention, 30 designates a hot plate, which, instead of being rectangular is circular in form, and has marginal downwardly and outwardly inclined walls 31. Openings 32, 33 and 34 formed in this hot plate provide for heating the cooking receptacle. Beneath the plate and supported thereby, by means of a bolt 35 is a substantially Y shaped distributor comprising a flat top wall 37 and depending marginal flanges 37′, which latter confine the heat within the distributor. The extremities of the Y shaped distributor are disposed beneath the openings in the hot plate and have openings 38 therein, somewhat smaller than the openings in the hot plate, but in registration therewith. In addition to the openings 38, a plurality of perforations are formed adjacent the extremities of the distributor whereby the heat from the distributor will pass thru the perforations onto the bottoms of the vessels supported on the hot plate.

An oven chamber 39 is provided for use in connection with the hot plate 30, if desired, and is supported by tubular standards 40, the ends of which receive pins 41 and 42 carried by the wall 31 and under side of the oven respectively. Thru one of the flanges of the distributor a substantially L shaped coupling 43 extends, with one extremity fitting within an opening formed in the hot plate. A tubular heat conduit 44 is removably mounted within the upper end of the coupling and extends upwardly to and within the interior of the oven chamber. It will be seen that heat from the distributor will be conducted to the oven by this arrangement. A damper 45 is mounted in the conduit to control the supply of heat. It will thus be seen that the oven may be removed from the hot plate when desired, by simply removing the tubular standards and conduit.

The hot plate may be equipped with a single coil or loop of water pipe as shown at 46, Figs. 7 and 8, so that if the device is to be made a permanent attachment upon the gas range, connection may be made with the water-back or water heating aparatus and the heat confined beneath the plate may be utilized for heating the water circulating in the pipe. The pipe 46 may be fastened in any suitable manner upon the hot plate and terminates in screw threaded nipples or projections 47 which project thru openings 48 in the side of the hot plate and in this way provide for connection with the water-back.

I claim.

1. A cooking device comprising a hot plate member consisting of a plate having a plurality of spaced openings therein over which cooking vessels are to be placed so as to rest upon the hot plate, a wall extending downwardly from the hot plate and adapted at its lower edge to engage the hot plate of an ordinary gas stove, whereby the first named hot plate is spaced upwardly from the gas stove hot plate and means associated with the first named hot plate for conducting heat from the burner over which the said hot plate is placed to the respective holes in said hot plate, which means comprises a plate secured beneath and close to the first named plate and extending to points beneath the cooking openings in said first named plate, said extended portions of the last named plate having openings therein registering with the said cooking openings and downwardly directed flanges on the margins of said last named plate.

2. A cooking device comprising a member adapted to be placed over a burner of a gas stove so as to rest upon the hot plate of the gas stove, said member having a plurality of openings therein over which cooking vessels are adapted to be placed, means carried by said member for supporting the same in superposed relation to the hot plate of a gas stove, and means for conducting the heat from a single burner over which the member is placed, to the several holes in the member, said means comprising a horizontally disposed plate arranged beneath and close to said member and extending to points beneath the cooking openings in said member, said extended portions having openings therein considerably smaller than those of and registering with the openings of said member, and downwardly directed flanges carried on the side and end edges of said plate and extended portions thereof.

3. A cooking device comprising a member for supporting a plurality of cooking vessels in close proximity to a single burner of a gas cook stove, means for conducting heat from the burner to certain points of said member over which the vessels are disposed, which means comprises a distributor, the central portion of which is adapted to be disposed over the center of the burner, extension portions on the distributor arranged to direct the heat from said central point to the certain points of said member, and downwardly directed flanges on the margins of said central and extension portions of said distributer.

ANTHONY MILLER.